May 11, 1954     R. A. McCONNELL     2,678,439
MOVING TARGET INDICATION RADAR SYSTEM
Filed Dec. 10, 1945
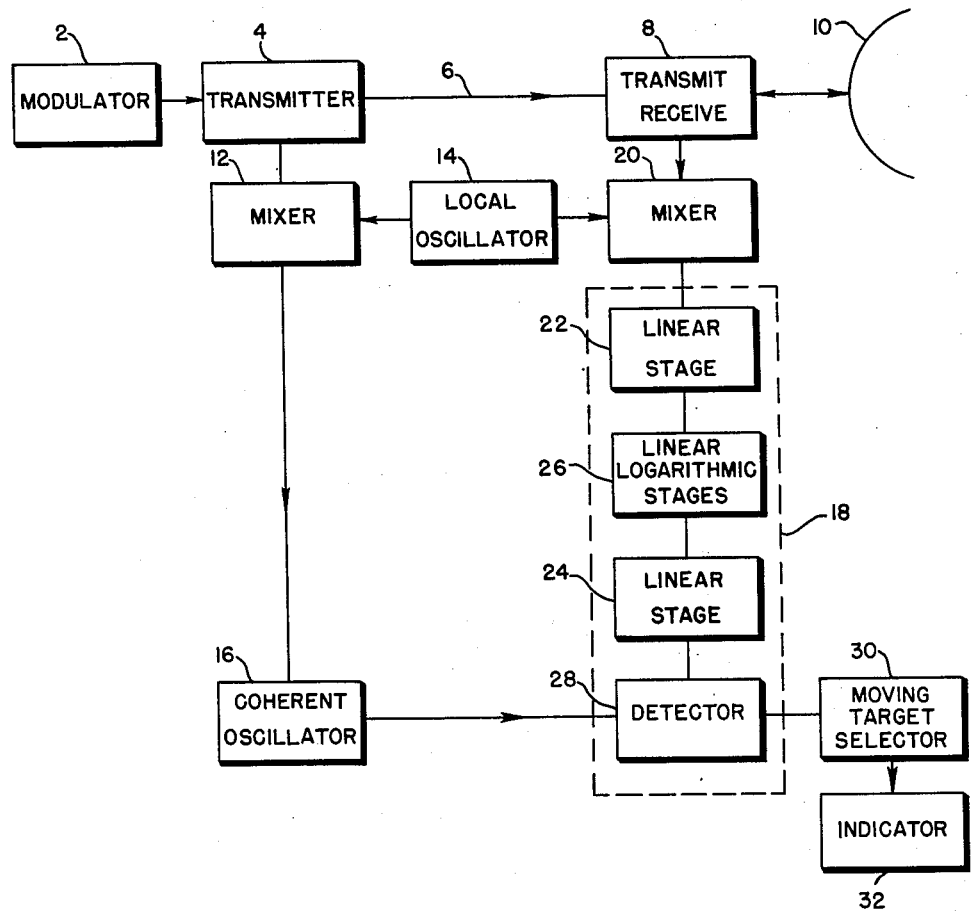
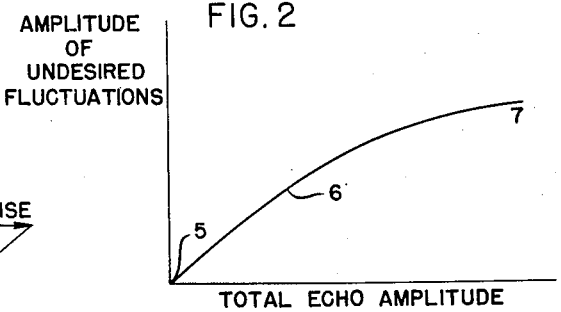
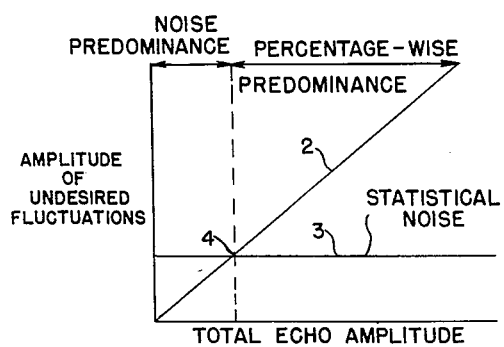
INVENTOR
ROBERT A. Mc CONNELL
BY William D. Hall.
ATTORNEY

UNITED STATES PATENT OFFICE 2,678,439

MOVING TARGET INDICATION RADAR SYSTEM

Robert A. McConnell, Cambridge, Mass., assignor, by mesne assignments, to the United States of America as represented by the Secretary of War Application December 10, 1945, Serial No. 634,076

6 Claims. (Cl. 343—7.7)

The present invention relates to a radio object locating system adapted to distinguish fixed objects from moving objects, and it relates more particularly to such a system employing a receiver having a predetermined response characteristic.

In a radio object locating system which distinguishes fixed objects from moving objects, exploratory pulses of radiant energy are transmitted in the usual manner. In addition, reference oscillations are provided, said reference oscillations having a fixed phase relation with respect to each exploratory pulse. The relative phase between the reference oscillations and echo pulses returned from stationary objects remains unchanged from pulse to pulse; whereas the relative phase between the reference oscillations and echo pulses from moving objects varies from pulse to pulse. The echo pulses are combined in an additive manner with the reference oscillations and the resultant combination is detected to provide video pulses. As the phase of echoes from moving objects changes from pulse to pulse, the amplitude of the resultant video pulses likewise changes. In the instance of stationary objects, however, the echo pulses have a non-varying phase and as a result, the resultant video pulses have a non-varying amplitude.

The reference oscillations may consist of locally generated continuous wave oscillations locked in a fixed phase relation with the exploratory pulses. Systems employing such a local oscillator are referred to as coherent pulse echo systems. If desired, echo pulses from fixed objects at substantially the same range as the moving objects may be used as reference oscillations. Systems of this latter type are referred to as non-coherent pulse echo systems.

It is often desirable to provide an indication of moving objects only. Systems which are thus adapted to thus distinguish fixed objects from moving objects may be referred to as moving target indication (MTI systems). Because the amplitude of video pulses manifesting stationary objects remains substantially constant from pulse to pulse, and because the amplitude of video pulses manifesting moving objects varies from pulse to pulse, stationary objects may be "removed" from the indicator by a moving target selector which ignores signals that have the same amplitude from pulse to pulse. One such moving target selector is more fully disclosed in a copending application of Alfred G. Emslie, Serial No. 594,266, entitled "Moving Object Detection System," filed May 17, 1945, and issued June 20, 1950, as Patent No. 2,512,144.

The problem of indicating moving objects only is not simply one of distinguishing between signals of non-varying and varying amplitude because certain undesired spurious amplitude changes are introduced to the system which must be "ignored" by the system for successful operation. If this is not done, certain spurious amplitude changes may provide a false indication of moving objects. These amplitude fluctuations in general fall into four categories (1) statistical or random noise, (2) equipment instability, (3) ground clutter fading and (4) scanning. Fluctuations due to statistical noise are independent of the magnitude of the echo signal input, while those due to the latter three causes listed above are essentially percentage-wise functions of (i. e., are directly proportional to) the amplitude of the received echo signal. It is evident that for a small echo, the noise fluctuations are predominant and as the echo size increases, percentage-wise fluctuations become significant and finally they are strongly predominant over noise.

It is therefore an object of the present invention to provide a radio object locating system whereby spurious fluctuations cannot be mistaken for a target.

It is another object of the present invention to provide a radio object locating system wherein undesired percentage-wise fluctuations are reduced to predetermined level.

It is still another object of the present invention to provide a radio object locating system including a receiver which has a substantially linear-logarithmic characteristic.

The invention however will be more fully understood by reference to the following detailed description when taken into consideration with the accompanying drawing wherein.

Fig. 1 is a graph showing the characteristics of undesired fluctuations;

Fig. 2 is a graph indicating the desired response characteristic for the receiver; and Fig. 3 is a block diagram of a moving target indication (MTI) system having a linear-logarithmic characteristic.

Reference is made to Fig. 1 which is a graph showing certain characteristics of received signals. In the graph, total echo amplitude is plotted as the abscissa and the amplitude of the undesired fluctuations is plotted as the ordinate. As the percentage-wise fluctuations are directly proportional to the size of the received echo signals, they may be plotted as curve 2 (straight line). As the noise is independent of the amplitude of the received echo pulses, the curve representing said noise may be represented as line 3. By examination of the figure, it can be seen that when the echo amplitude is below a certain predeterminable value, as determined by intersection 4 of lines 2 and 3 respectively, the noise is greater than the undesired fluctuations. When the signal is greater than this predeterminable value, the undesired fluctuations are greater than noise. The solution for discriminating against these undesirable fluctuations requires a reduction on the indicator to a level equal to or below that of noise so that the fluctuations may be mistaken for noise but cannot be mistaken for fluctuations representing a moving object. Thus, the problem of suppressing spurious signals is one of reducing percentage-wise fluctuations to the same visual level, on the indicator, as noise.

Since reduction in percentage-wise fluctuations also means a loss in signal amplitude, it is important that this loss in receiver sensitivity be no greater than is necessary. The graph of Fig. 1 shows that the fluctuations are a function of the total echo amplitude and hence, the fluctuation suppression should be achieved before the "total echo" information is discarded in the moving target selector. It is therefore in the receiver that percentage-wise fluctuations are reduced below noise level and the necessary receiver gain characteristics for performing this function may be determined by the following analysis.

An inspection of Figure 1 indicates that in the region where the echo size is small and where noise fluctuations are predominant, the receiver must have a constant dynamic characteristic (i. e., a constant slope), and should therefore be linear as is shown in this region of Fig. 2. When the constant phase input becomes sufficiently large so that percentage-wise fluctuations are predominant, the receiver characteristic must take on a new and obviously non-linear curve, the mathematical nature of which is easily derived as follows:

$I$=receiver input signal
$O$=receiver output signal
$f=dI$=undesired receiver input fluctuation
$F=dO$=undesired receiver output fluctuations $k$, $m$, and $n$ are constants For the condition where percentage-wise fluctuations predominate $$f=dI=kI$$

It is desired, however, that in the receiver output $$F=dO=m$$

Then:

$$\frac{dO}{dI}=\frac{m}{kI}$$

Or:

$$dO=\frac{m}{k}\frac{dI}{I}$$

By integration:

$$O=\int \frac{m}{k}\frac{dI}{I}=\frac{m}{k}\log I+n$$

Or:

$$O : : \log I$$

Thus it is shown that a receiver whose gain characteristic is approximately linear throughout the region of noise predominance and logarithmic where percentage-wise fluctuations become predominant will achieve the desired result of making the spurious output fluctuation constant.

Fig. 2 is a graph of a generally logarithmic response characteristic which the receiver should have. The curve is substantially linear between points 5 and 6 and substantially logarithmic between points 6 and 7. Such a response curve is based on the approximate assumptions that only noise fluctuations are significant in the linear region of the characteristic, and only percentage-wise fluctuations in the logarithmic portion.

A more detailed analysis of the linear logarithmic receiver introduces the problem of the exact nature of the transition points between the linear and the logarithmic portions of the receiver characteristic curve. One further assumption that can be made is that the noise and percentage-wise fluctuations are additive in the region where both are important and the equation for the receiver characteristic may then be derived as follows:

Definitions:

$I$=receiver input signal
$O$=receiver output signal
$f=dI$=undesired receiver input fluctuations
$F=dO$=undesired receiver output fluctuations $k$, $m$, and $n$ are constants Assumed:

$$f=dI=kI+m; \quad F=dO=n$$

(1) $$\frac{dO}{dI}=\frac{n}{kI+m}$$

(2) $$dO=\frac{ndI}{kI+m}$$

then by integration (3) $$O=\frac{n}{k}\log\left(I+\frac{m}{k}\right)$$

It is thus seen that the receiver should have this general response characteristic. This can be accomplished by constructing a multi-stage receiver including stages having a substantially linear characteristic and stages having a suitable linear logarithmic characteristic. Consider expression (2) above and assume that an input I is fed into the receiver, where the fluctuation $$dI=k^1I+m^1$$

then the output fluctuation of the receiver output is $$dO=\frac{nk^1I+m^1}{kI+m}$$

Now if $k^1$ is larger than the $k$ for which the logarithmic amplifier (of the receiver) was designed then the output fluctuation $dO$ can still be that value for which the amplifier was designed, by varying $m$ and $n$.

Assume $k^1$ to be greater than $k$, then by changing $m^1$ in the ratio $$\frac{k^1}{k}$$

and changing $n$ in the inverse ratio the output fluctuation $dO$ may be maintained at the value for which the amplifier was designed. This may be seen from the following:

For convenience let $$\frac{k^1}{k}=r$$

then we want $$m^1 = \frac{k^1}{k} m$$

or $$m^1 = rm$$

then $$dO = \frac{nrkI + rm}{kI + m}$$

now if $n$ is altered by the inverse ratio $$dO = \frac{n}{r} \frac{r(kI+m)}{kI+m} = \text{constant}$$

If the receiver has the characteristic as given by (3) above, namely;

$$O = \frac{n}{k} \log \left( I + \frac{m}{k} \right)$$

it can be seen that increasing $m$ is accomplished by increasing the gain of the linear stages of the receiver which are provided before the logarithmic amplifier stages. Similarly, decreasing $n$ is accomplished by decreasing the gain of the linear stages of the receiver after the logarithmic portion.

Thus, it can be said an increase in percentagewise fluctuations (corresponding to an increase in $k$) may be compensated for increasing the gain of the linear stages ahead of the linear-logarithmic stages of the receiver (corresponding to a change in $m$) and by decreasing the gain of the linear stages following the linear-logarithmic stages (corresponding to a change in $n$). Thus, the final adjustment of the linear-logarithmic receiver for optimum indicator results is determined by the operator himself.

Refer now to Fig. 3 which shows one embodiment of a radio object locating system employing a linear-logarithmic receiver. Modulator 2 periodically actuates transmitter 4 which in turn provides short duration high carrier frequency exploratory pulses of radiant energy which are fed by means of transmission line 6 through transmit-receive switch 8 to directional antenna 10.

Transmit-receive switch 8 serves to connect transmitter 4 to directional antenna 10 during the transmission of exploratory pulses and to disconnect the receiver channel presently to be described. During the interim between exploratory pulses and while echo pulses are being received, these connections are reversed.

A portion of each exploratory pulse issuing from transmitter 4 is applied to mixer 12, another input to said mixer consisting of continuous wave oscillations from local oscillator 14. The beat frequency output from mixer 12 consists of pulses having an intermediate carrier frequency which are then applied to coherent oscillator 16 as synchronizing signals. The output of coherent oscillator 16 consists of intermediate frequency continuous wave reference oscillations which are synchronized in phase to each exploratory pulse. These reference oscillations are then applied to linear logarithmic receiver 18.

Object returned echo pulses received at directional antenna 10 are fed through transmit-receive switch 8 to mixer 20. Also applied to mixer 20 are continuous wave oscillations from local oscillator 14. The beat frequency output from mixer 20 then consists of echo pulses having an intermediate carrier frequency. These echo pulses are then applied to linear-logarithmic receiver 18.

Linear-logarithmic receiver 18 has a response characteristic as represented by Expression 3. By means of linear amplifier stages 22 and 24, the constants $m$ and $n$ respectively (of Expression 2) may be varied. Linear-logarithmic amplifier stages 26 provide the logarithmic response characteristic for the receiver. The output of the amplifying stages is then applied to detector 28, a second input to detector 28 being the reference oscillations from coherent oscillator 16. The two inputs to said detector combine therein to a degree depending upon their relative phase and the resultant combination is detected to provide video pulses which may be applied to moving target selector 30.

The moving target selector compares successive video pulses and provides an output proportional to the difference in amplitude thereof. As video pulses representing stationary objects are non-varying in amplitude and video pulses representing moving objects have a periodic variation in amplitude, the output derived from moving target selector represents moving objects only. These signals may then be applied to indicator 32 whereby moving objects only are indicated.

There are many ways in which a receiver may be constructed to have a generally logarithmic characteristic and hence it is to be understood that the present invention is not limited to any one type of logarithmic receiver. An amplifier which may be used to provide the logarithmic stages of receiver 18 is more fully described in a copending application of Logan M. Belleville entitled "Amplifier," Serial No. 604,035, filed July 9, 1945, issued December 4, 1951 as Patent No. 2,577,506.

Although there has been here described, one embodiment of the present invention it will be manifest to those skilled in the art that various modifications may be made therein without departing from the invention. It is therefore aimed in the appended claims to cover all such changes and modifications as fall within the spirit and scope of the invention.

What is claimed is:

1. A radio object locating system including means for transmitting high carrier frequency exploratory pulses of radiant energy, means for receiving corresponding echo-pulses, means for reducing the carrier frequency of said received echo pulses to an intermediate carrier frequency in order to obtain intermediate carrier frequency echo pulses, means for providing reference oscillations having a fixed phase relation with respect to each exploratory pulse, means for substantially linearly amplifying echo pulses having an amplitude less than a predeterminable amplitude and substantially logarithmically amplifying echo pulses having an amplitude greater than said predeterminable amplitude, whereby undesired percentage-wise amplitude fluctuations are prevented from exceeding a predetermined value, means for applying said intermediate carrier frequency echo pulses to said amplifying means, means for combining said reference oscillations and said echo pulses to obtain video pulses whereby video pulses manifesting moving objects have a cyclical variation in amplitude and video pulses manifesting stationary objects have a non-varying amplitude, means for obtaining a residual signal proportional to the difference in amplitude between successive video pulses, an indicator and means for applying said residual signal thereto.

2. A radio object locating system including means for transmitting high carrier frequency exporatory pulses of radiant energy, a receiver for corresponding echo pulses, said receiver having means for producing a fluctuation output whose amplitude is substantially proportional to the fluctuation of input echo pulses for input echo pulses having an instantaneous amplitude less than a predeterminable amplitude, and producing a fluctuation output whose amplitude is substantially proportional to the product of the fluctuation of the input echo pulses multiplied by the logarithm of the amplitude of the input echo pulses for input echo pulses having an instantaneous amplitude greater than said predeterminable amplitude, selector means for comparing the receiver output echo pulses corresponding to one transmitted exploratory pulse with the receiver output echo pulses corresponding to a following transmitted exploratory pulse for deriving residual signals from echo pulses from moving targets, means for applying said receiver output pulses to the input of said selector means, an indicator and means for applying said residual signals thereto.

3. A moving target radio object locating system including means for transmitting exploratory pulses of radiant energy, means for receiving corresponding echo pulses of radiant energy, a receiver having a substantially logarithmic amplification characteristic for echoes above a predetermined amplitude and having a substantially linear emplification characteristic for echoes below said amplitude whereby unwanted echo fluctuations may be reduced to or below a chosen level, means for applying said echo pulses to said receiver, means for rejecting echoes from fixed targets, means for connecting the input of said rejecting means to the output of said receiver, an indicator and means for connecting the input thereof to the output of said rejecting means.

4. A radio object locating system including means for transmitting exploratory pulses of radiant energy, means for receiving corresponding echo pulses of radiant energy, a receiver having a generally logarithmic amplification characteristic for echoes above a predetermined amplitude and having a substantially linear amplification characteristic for echoes below said amplitude, means for applying said echo signals to said receiver, means for deriving video pulses from said receiver, whereby percentage-wise fluctuations of the amplitude of said echo pulses are reduced to a predeterminable level, and means connected to said receiver for deriving signals from echo pulses from moving objects.

5. A radio object locating system of the character described comprising a pulse echo receiver having means substantially linearly amplifying echo pulses having an amplitude less than a predeterminable amplitude and substantially logarithmically amplifying echo pulses having an amplitude greater than a predeterminable amplitude, means connected to said receiver for deriving signals from echo pulses from moving objects, and means for indicating said signals.

6. A radio object locating system including means for transmitting exploratory pulses of radiant energy, means for receiving corresponding echo pulses of radiant energy, a receiver having an amplification factor which varies substantially logarithmically with signals above a given amplitude impressed on the input thereof and varies substantially linearly with signals below said amplitude, means for applying said echo pulses to the input of said receiver, means connected to said receiver for deriving signals from echo pulses from moving objects, and means for indicating said signals.

References Cited in the file of this patent

UNITED STATES PATENTS

| Number | Name | Date |
|---|---|---|
| 2,406,316 | Blumlein | Aug. 27, 1946 |
| 2,410,424 | Brown | Nov. 5, 1946 |
| 2,422,135 | Sanders, Jr. | June 10, 1947 |
| 2,512,144 | Emslie (1) | June 20, 1950 |
| 2,517,549 | Earp | Aug. 8, 1950 |
| 2,543,448 | Emslie (2) | Feb. 27, 1951 |
| 2,646,562 | Emslie | July 21, 1953 |